(12) United States Patent
Paik et al.

(10) Patent No.: US 7,426,081 B2
(45) Date of Patent: Sep. 16, 2008

(54) LENS TRANSFER DEVICE

(75) Inventors: Ki Mun Paik, Kyungki-do (KR); Youn Kyun Bin, Kyungki-do (KR); Jung Seok Lee, Kyungki-do (KR); Dong Kyun Lee, Seoul (KR); Byung Woo Kang, Seoul (KR); Jung Ho Ryu, Kyungki-do (KR); Sung Deuk Kim, Seoul (KR); Burhanettin Koc, Kyungki-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/585,283

(22) Filed: Oct. 24, 2006

(65) Prior Publication Data
US 2007/0091463 A1  Apr. 26, 2007

(30) Foreign Application Priority Data
Oct. 24, 2005  (KR) .................. 10-2005-0100199

(51) Int. Cl.
G02B 15/14 (2006.01)
G02B 27/00 (2006.01)
(52) U.S. Cl. .................... 359/694; 359/822
(58) Field of Classification Search ........... 359/694, 359/696–698, 703–704, 813–814, 822–826
See application file for complete search history.

(56) References Cited

U.S. PATENT DOCUMENTS 5,490,015 A * 2/1996 Umeyama et al. ........... 359/824
5,768,038 A 6/1998 Emura ..................... 359/824
5,812,330 A * 9/1998 Akada ..................... 359/823
6,215,605 B1 4/2001 Kuwana et al.
6,268,970 B1 7/2001 Ito et al.
2005/0067922 A1 3/2005 Sasaki et al. ........... 310/323.09

FOREIGN PATENT DOCUMENTS

EP  1 753 040  2/2007
EP  1 753 041  2/2007
EP  1 753 044  2/2007

(Continued)

OTHER PUBLICATIONS

British Office Action issued Feb. 14, 2007 in corresponding British Patent Application No. GB0621121.3.

(Continued)

*Primary Examiner*—Scott J. Sugarman
*Assistant Examiner*—Dawayne A Pinkney

(57) ABSTRACT

The invention provides a lens transfer device including at least one lens and a lens barrel. The lens barrel has a lens receiving part with the lens arranged in an inner space thereof and an extension extending radially from an outer surface of the lens receiving part. An actuator has a body and an output member at a leading end of the actuator to contact the extension, and is adapted to expand/contract and bend in response to an external supply voltage to provide a driving force necessary for transfer of the lens barrel through the output member. A pressing member has a free end contacting a rear end of the actuator to force the actuator against the extension, and a guide guides the transfer of the lens barrel along an optical axis.

18 Claims, 9 Drawing Sheets

FOREIGN PATENT DOCUMENTS

| | | |
|---|---|---|
| JP | 5-88066 | 4/1993 |
| JP | 6-94964 | 4/1994 |
| JP | 7-104166 | 4/1995 |
| JP | 10-90584 | 4/1998 |
| JP | 11-346486 | 12/1999 |
| JP | 2001-45777 | 2/2001 |
| JP | 2005-354832 | 12/2005 |
| JP | 2006-101611 | 4/2006 |
| JP | 2006098577 | 4/2006 |

OTHER PUBLICATIONS

UK Intellectual Property Office Examination Report, mailed Jul. 1, 2008 and issued in corresponding UK Patent Application No. GB0621121.3.

Japanese Patent Office Action, mailed Jul. 1, 2008 and issued in corresponding Japanese Patent Application No. 2006-288181.

* cited by examiner

LENS TRANSFER DEVICE

CLAIM OF PRIORITY

This application claims the benefit of Korean Patent Application No. 2005-100199 filed on Oct. 24, 2005, in the Korean Intellectual Property Office, the disclosure of which is incorporated herein by reference.

BACKGROUND OF THE INVENTION

1. Field of the Invention

The present invention relates to a device for transferring a lens in use for an optical device, and more particularly, a lens transfer device with a simple structure of drive mechanism, by which a miniaturization design can be enabled, power loss related with lens transfer can be minimized and a lens can be transferred more precisely and stably.

2. Description of the Related Art

In general, an optical instrument has a lens transfer device for transferring a lens by using a cam, screw, motor or piezoelectric element. The lens transfer device uses the motor or piezoelectric element as means for generating driving force and the cam or screw for delivering the driving force.

Accordingly, the lens transfer device is adapted to enable a zooming or focusing function by transferring the lens and thus changing the relative distance of the lens.

FIG. 1 shows a zoom lens barrel for transferring a lens by using a cam, disclosed by U.S. Pat. No. 6,268,970.

According to U.S. Pat. No. 6,268,970 above, a group of lenses 12a, 14a and 16a are transferred along cam curves formed on barrels 12, 14 and 16 to maintain relative distances corresponding to zoom or focal lengths.

In operation of this structure, the relative locations of the lenses 12a, 14a and 16a are easily determined according to the configuration of the cam curves, and an electromagnetic motor is used as a driving source. Here, a zoom lens barrel 10 is adapted to convert rotational motion of the barrel made along the cam curve into a linear motion by using a plurality of deceleration gears, and thus its structure is sophisticated.

Since the lens transfer device as above has a plurality of deceleration gears, it is difficult to miniaturize it. Furthermore, the electromagnetic motor of the lens transfer device consume a large amount of power and generates electromagnetic waves harmful to the human body as well. In addition, it is difficult to transfer the lens with high precision.

FIG. 2 shows a zoom lens mechanism of a camera designed to transfer a lens with screws.

That is, a stationary lens group 22a is combined to a camera body 22, in the object side, and a receiving space is provided in the interior. In the receiving space, an electromagnetic motor 24 is installed, and a guide screw 24a is combined to a shaft of the motor 24.

A power transmission member 26 is engaged on the outer periphery of the guide screw 24a, and a lens barrel 28 is combined to a portion of the power transmission member 26.

In addition, a movable lens group 28a is combined to the lens barrel 28, which is transferred along an optical axis by a guide shaft 29, which is combined along the optical axis inside the camera body 22.

Accordingly, as the motor 24 is actuated, the guide screw 24a rotates, transferring the power transmission member 26 along the optical axis. As the power transmission member 26 is transferred along the optical axis, the barrel 28 is guided by the guide shaft 29 also along the optical axis, enabling a zooming function.

However, the zoom lens mechanism of this camera also uses an electromagnetic motor and thus needs a plurality of deceleration gears, which in turn hinders miniaturization.

Furthermore, it is difficult to clear electromagnetic waves generating from the motor or to transfer the lens with high precision.

FIGS. 3a and 3b show a driving device 30 for transferring a lens by using piezoelectric elements in order to overcome problems related with the above described mechanisms.

That is, piezoelectric actuators 32 are fixed to a base block 34 to transfer displacement to driving rods 36, thereby transferring lenses L1 to L4 by using a pressing force of slidable projections 38a and a force of inertia and acceleration effect of a lens frame 38. With this structure, the driving rods 36 can transfer the lens frames 38 or slide inside the projections 38a according to waveforms of input voltages, thereby transferring the lens in both directions.

Electromagnetic waves are not generated since the driving device 30 does not use an electromagnetic motor. The driving device 30 can also be simplified in its structure since it does not use a final reduction gear and the like as power transmission means.

However, the driving rod 36 is fixed in length and thus the length of the barrel is not adjustable, which makes it difficult to miniaturize the device. A driving circuit is also sophisticated since a driving signal is provided as an asymmetric waveform in place of sine wave.

There are rising demands for a lens transfer device which can be installed in a small volume, be controlled precisely with high transfer resolution, and produce a sufficient displacement for transfer with a small amount of driving force

SUMMARY OF THE INVENTION

The present invention has been made to solve the foregoing problems of the prior art and therefore an object of certain embodiments of the present invention is to provide a lens transfer device which can have a micro size owing to a simplified driving structure over a conventional electromagnetic driving mechanism.

Another object of the invention is to provide a lens transfer device capable of producing a large displacement from a low input supply voltage, thereby achieving excellent transfer resolution and minimizing power loss in relation with the operation of the device.

Further another object of the invention is to provide a lens transfer device having a guide mechanism for the transfer of a lens simplified over the prior art, capable of transferring a lens more precisely and stably.

According to an aspect of the invention for realizing the object, the invention provides a lens transfer device. The lens transfer device includes at least one lens; a lens barrel having a lens receiving part with the lens arranged in an inner space thereof and an extension extending radially from an outer surface of the lens receiving part; an actuator having a body and an output member provided at a leading end of the actuator to contact the extension, the body adapted to expand/contract and bend in response to an external supply voltage to provide a driving force necessary for transfer of the lens barrel through the output member; a pressing member with a free end contacting a rear end of the actuator to force the actuator against the extension; and a guide for guiding the transfer of the lens barrel along an optical axis.

Preferably, the actuator comprises a piezoelectric ultrasonic motor having a box-shaped body comprising a plurality of piezoelectric sheets stacked one on another.

Preferably, the extension has a contact member in a vertical surface thereof facing the output member, the contact member oriented to contact and intersect perpendicularly with the output member.

More preferably, the extension has a recess formed in the vertical surface thereof to receive the contact member.

More preferably, the contact member has a height substantially the same as that of the extension.

Preferably, the pressing member comprises a leaf spring for apply an elastic force to the actuator, the leaf spring having a free end bent outward to contact the rear end of the actuator and a fixing end bent toward the lens barrel.

More preferably, the pressing member further including an upper fixing portion extending at a predetermined length toward the body from the free end of the pressing member to force an upper surface of the body of the actuator directly downward.

More preferably, the upper fixing portion has a bent portion convexed downward from a leading end of the fixing portion to contact and apply elastic force to the upper surface of the body.

Preferably, the pressing member is formed longer than the actuator.

Preferably, the extension has a guide hole perforated therein to be parallel with the optical axis, wherein the guide has a first guide rod of a predetermined length inserted into the guide hole of the extension and a second guide rod of a predetermined length with an outer periphery contacting the extension to prevent the lens barrel from rotating.

More preferably, the first guide rod is assembled to the guide hole via one of a bushing and an oilless bearing.

More preferably, the first guide rod has a center located coplanar with a contact point where the output member of the actuator meets the contact member of the extension.

More preferably, the extension has a pair of guide support protrusions projecting therefrom in a direction perpendicular to a pressing direction of the pressing member, and wherein the outer periphery of the second guide rod is adapted to contact the guide support protrusions of the extension.

More preferably, the first and second guide rods are coated on outer peripheries with one material of fluorocarbons and molybdenum sulfides to minimize frictional force.

The lens transfer device further includes a base on which the lens barrel is seated, wherein the base has a first holder fixing the body of the actuator so that the output member of the actuator contacts the extension of the lens barrel, a second holder fixing a stationary end of the pressing member and a third holder fixing a lower end of the guide.

More preferably, the first holder has at least one U-shaped elastic fixing piece supporting a lower surface and elastically contacting both side surfaces of the body and a holding projection extending from a top end of the elastic piece to elastically contact an upper surface of the body.

More preferably, the second holder has a pair of vertical ribs which are L-shaped with a gap therebetween so that the stationary end of the pressing member is fixedly inserted into the gap.

More preferably, the third holder has first and second fixing holes receiving lower ends of the first and second guide rods of the guide, respectively.

Preferably, the lens barrel has a detection bar formed at one side thereof, and the device further includes a location sensor for detecting vertical location of the detection bar.

Preferably, the device further includes a housing for protecting the lens barrel, the actuator, the pressing member and the guide from external environments.

BRIEF DESCRIPTION OF THE DRAWINGS

The above and other objects, features and other advantages of the present invention will be more clearly understood from the following detailed description taken in conjunction with the accompanying drawings, in which:

FIG. 3b is a partial, exploded perspective view of FIG. 3a;

DETAILED DESCRIPTION OF THE PREFERRED EMBODIMENT

The present invention will now be described more fully hereinafter with reference to the accompanying drawings, in which preferred embodiments of the invention are shown.

Figure 1:
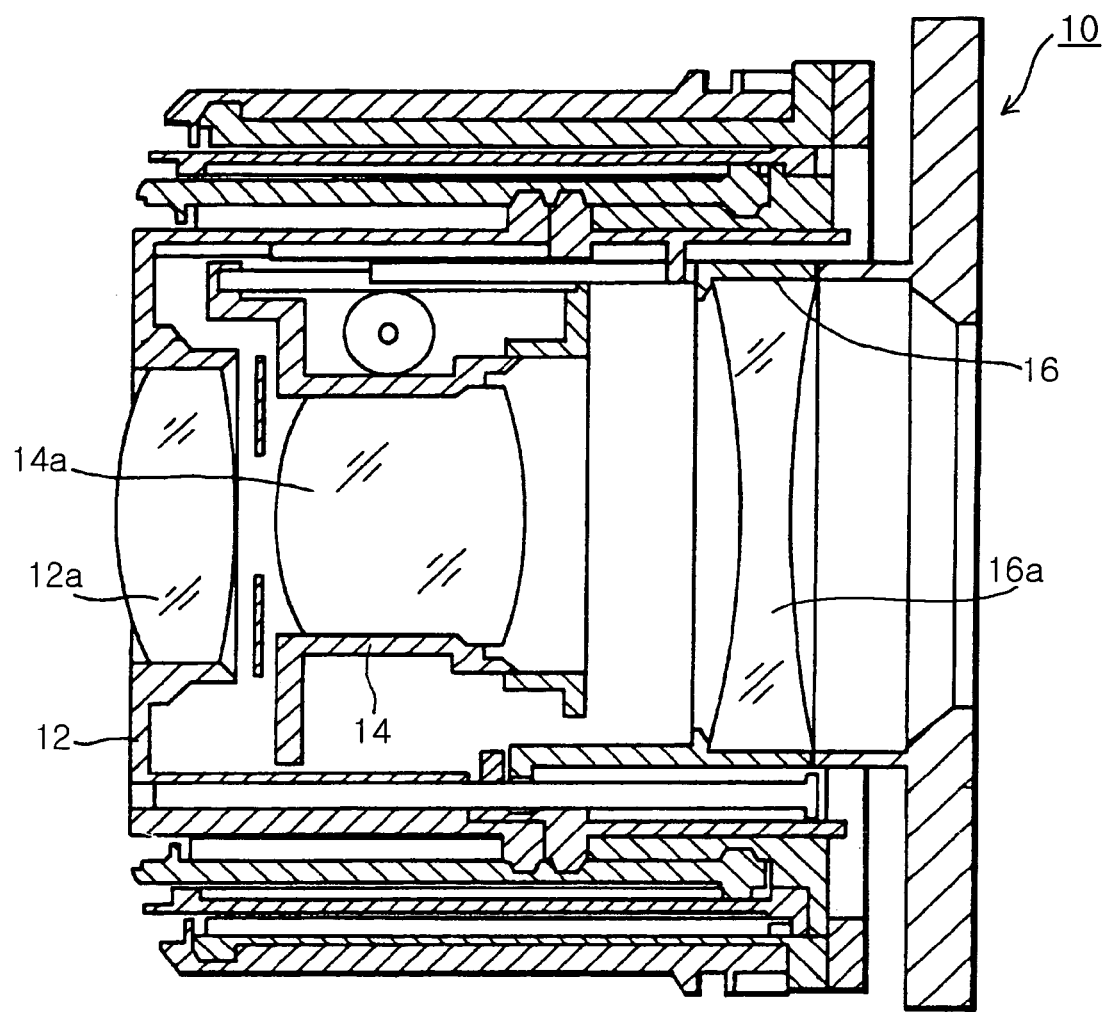
FIG. 1 is a cross-sectional view illustrating a conventional lens transfer device using a cam.
Figure 2:
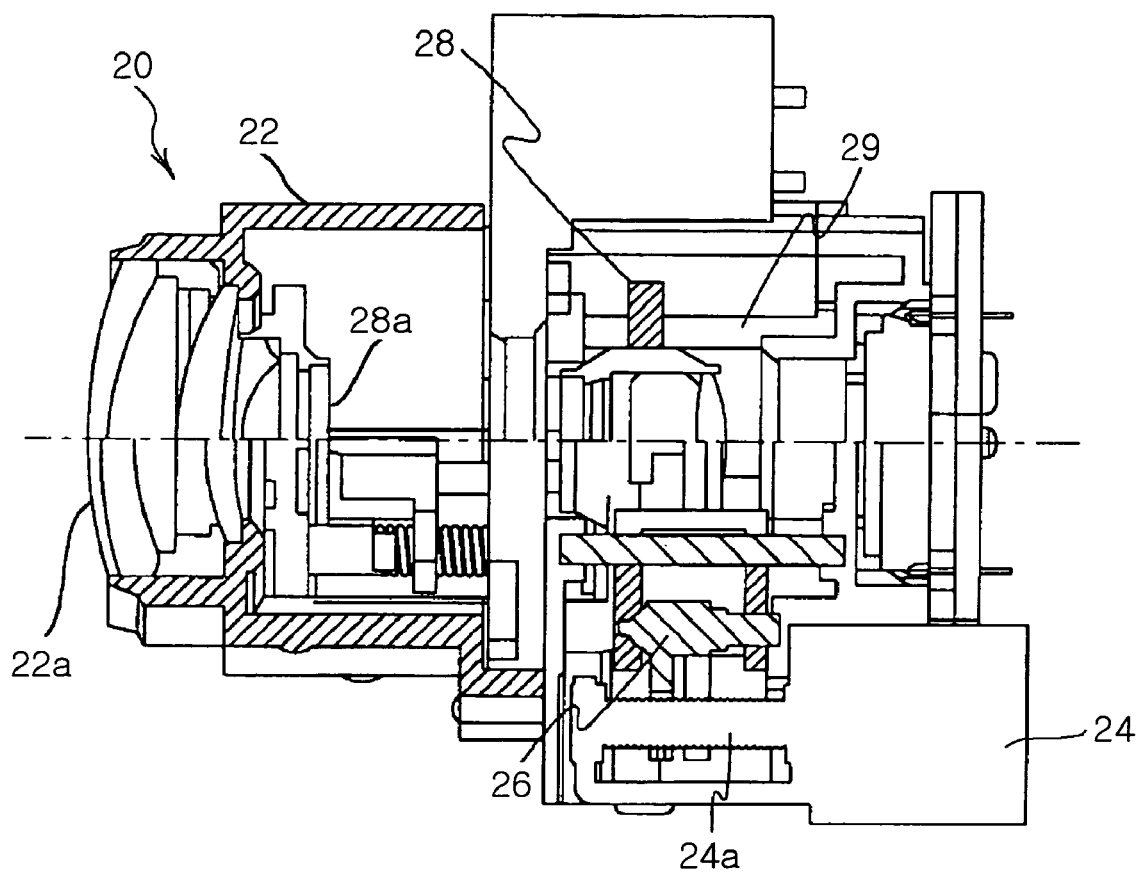
FIG. 2 is a cross-sectional view illustrating a conventional lens transfer device using a screw.
Figure 3A:
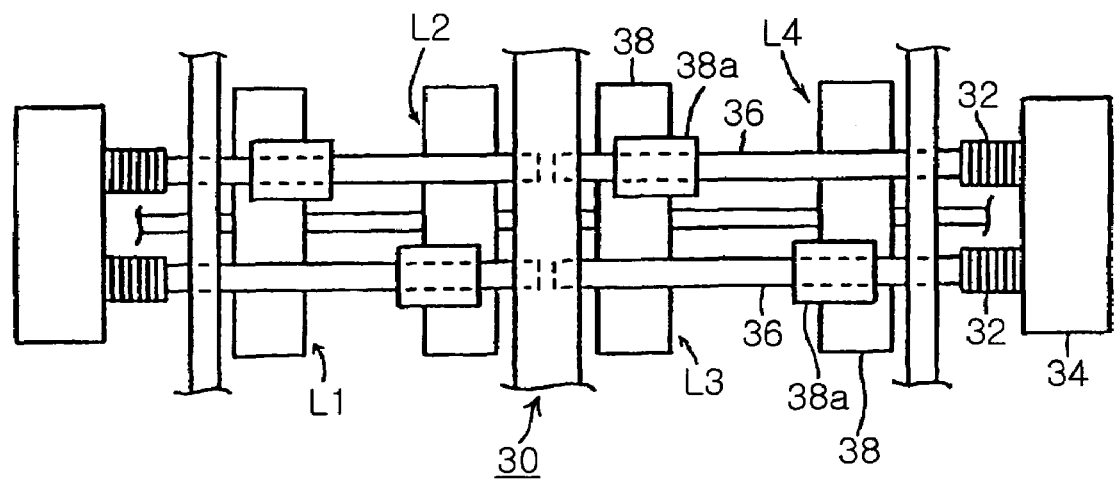
FIG. 3a is a plan view illustrating a conventional lens transfer device using a piezoelectric element.
Figure 3B:
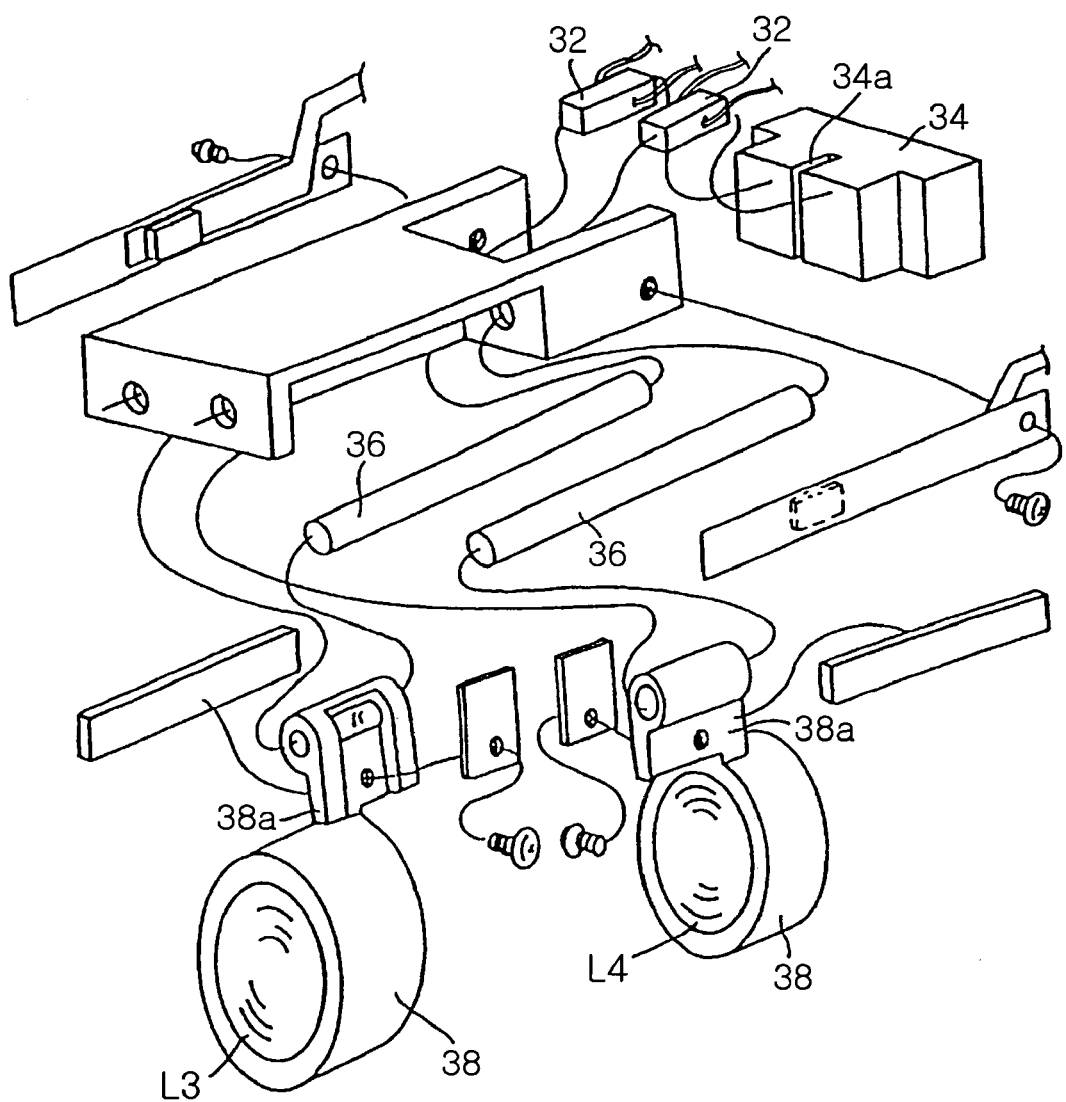
Figure 4:
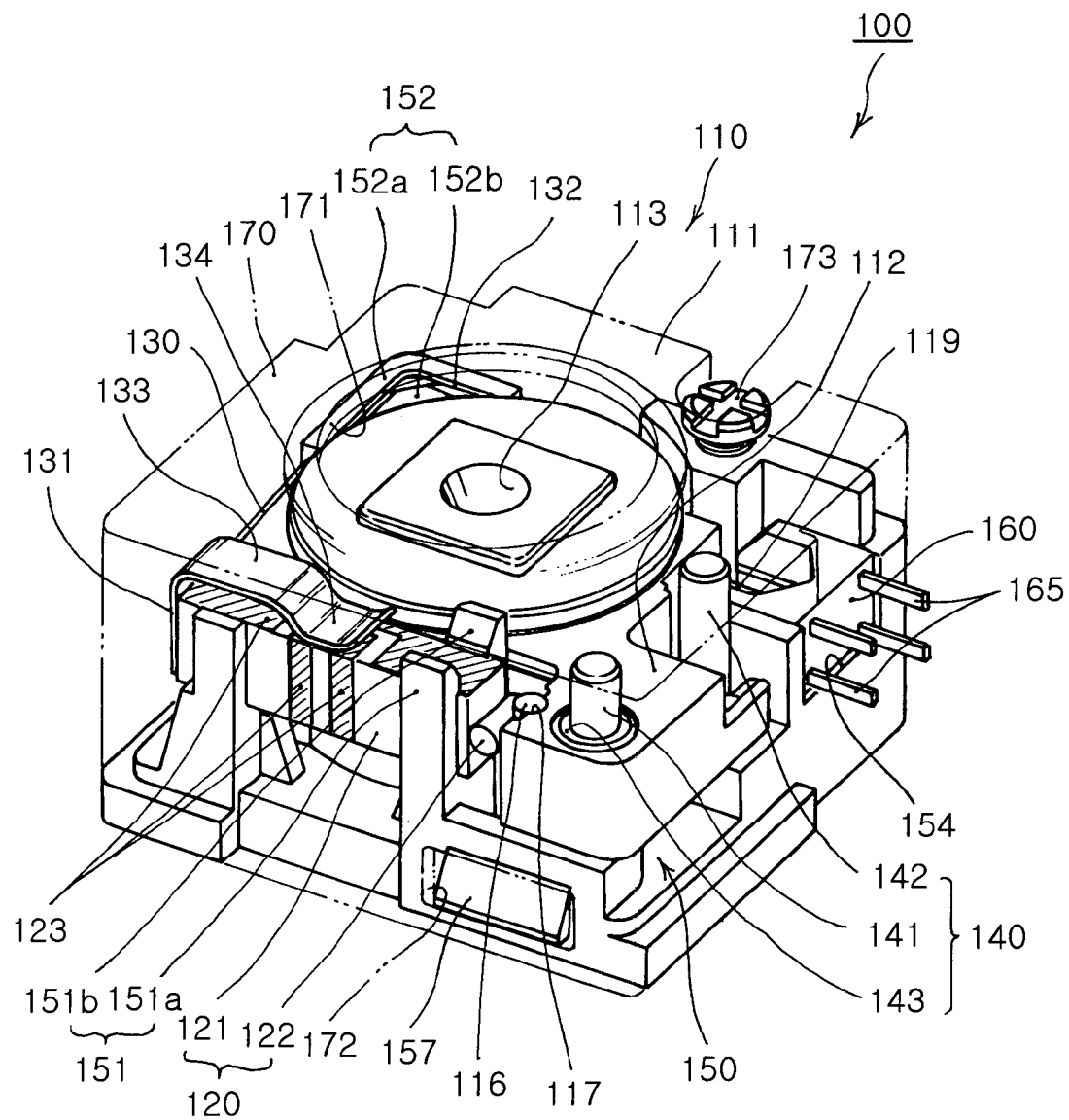
FIG. 4 is a perspective view illustrating a lens transfer device according to the invention.
Figure 5:
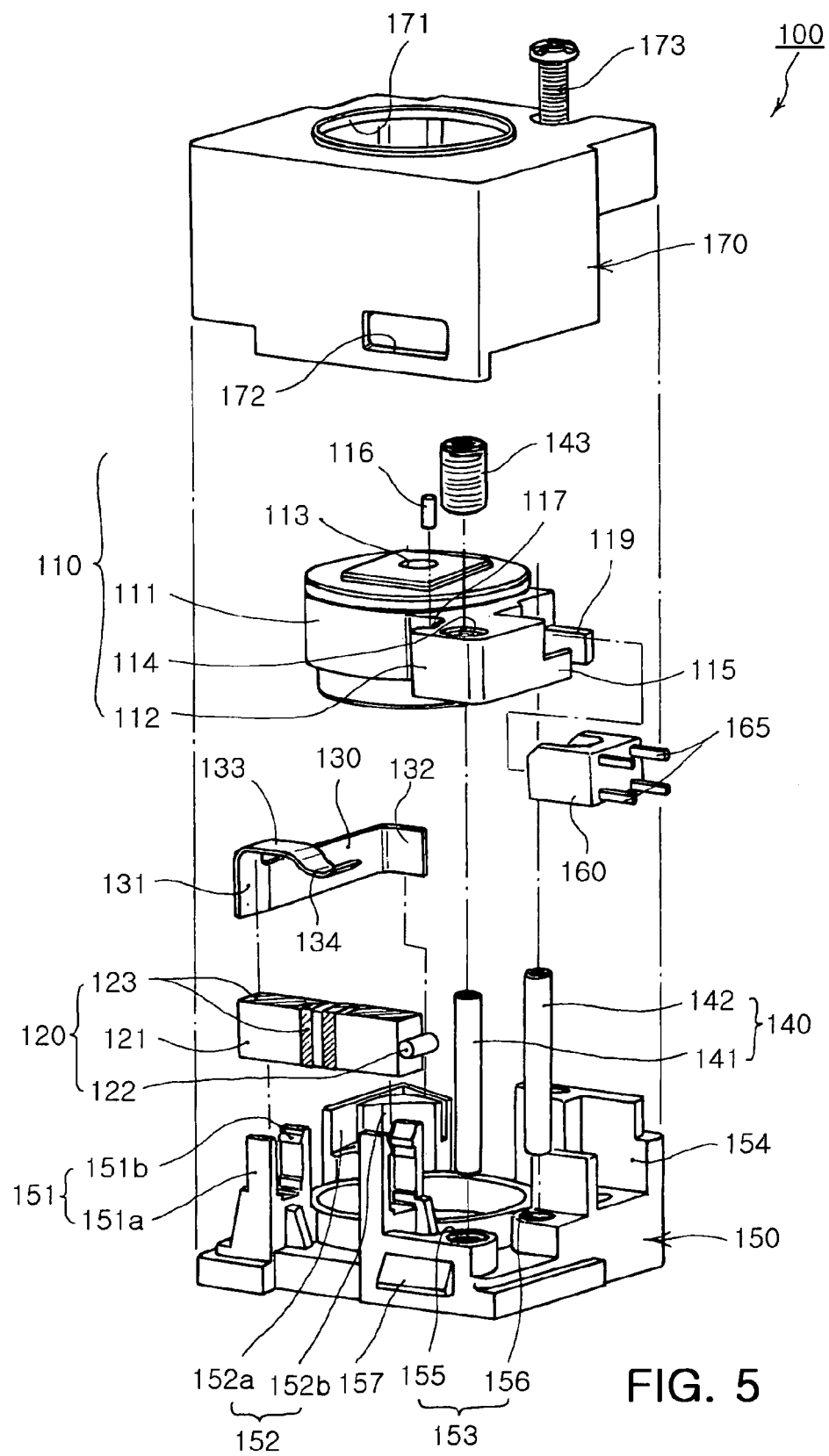
FIG. 5 is an exploded perspective view illustrating a lens transfer device according to the invention.

FIG. 4 is a perspective view illustrating a lens transfer device 100 according to the invention, and FIG. 5 is an exploded perspective view illustrating the lens transfer device 100 as shown in FIG. 4.

Referring to FIGS. 4 and 5, the lens transfer device 100 of the invention includes a lens barrel 110 with at least one lens contained therein, an actuator 120 for supplying a driving force to transfer the lens, a pressing member 130 for pressing the actuator 120 and a guide 140 for guiding the transfer of the lens barrel 110.

The lens barrel 110 includes a lens receiving part 111 and an extension 112. The lens receiving part 111 is of a container having a predetermined size of inner space which receives at least one lens to be oriented along the optical axis. The extension 112 is of a substantially box-shaped structure, extended in a radial direction from an outer surface of the lens receiving part 111.

While the extension 112 may be formed integrally with the lens barrel 110 at injection molding thereof, it is not intended to be limiting. Rather, the extension 112 may be injection-molded separately and then assembled to the cylindrical lens receiving part 111, which is also injection-molded separately.

A predetermined size of incident hole 113 is formed on the upper surface of the lens receiving part 111 so that its center is aligned with the optical axis. The extension 112 has a guide hole 114 perforated therein to be parallel with the optical axis so that a first guide rod 141 of the guide 140 is assembled into the guide hole 114. The extension 112 also has guide support protrusions 115 supporting a second guide rod 142 of the guide 140.

In addition, as shown in FIGS. 4 and 5, the actuator 120 is of a box-shaped piezoelectric ultrasonic motor composed of a body 121 and an output member 122. The body 121 is of a piezoelectric element with a plurality of electrode terminals 123 for receiving external supply voltage are provided on the outer surface thereof. The piezoelectric element of the body 121 is composed of a plurality of piezoelectric sheets stacked one on another so as to contract/expand longitudinally and bend vertically in response to a supply voltage applied through the electrode terminals 123.

The output member 122 is of a cylindrical friction member integrally mounted on a leading end facing the extension 112.

The output member 122 is preferably made of a material such as ceramic and metal which has an excellent abrasion resistance and a relatively large friction coefficient.

The actuator 120 is fixedly arranged in a first holder 151 extending from a base 150 on which the lens barrel 110 is mounted.

Figure 6:
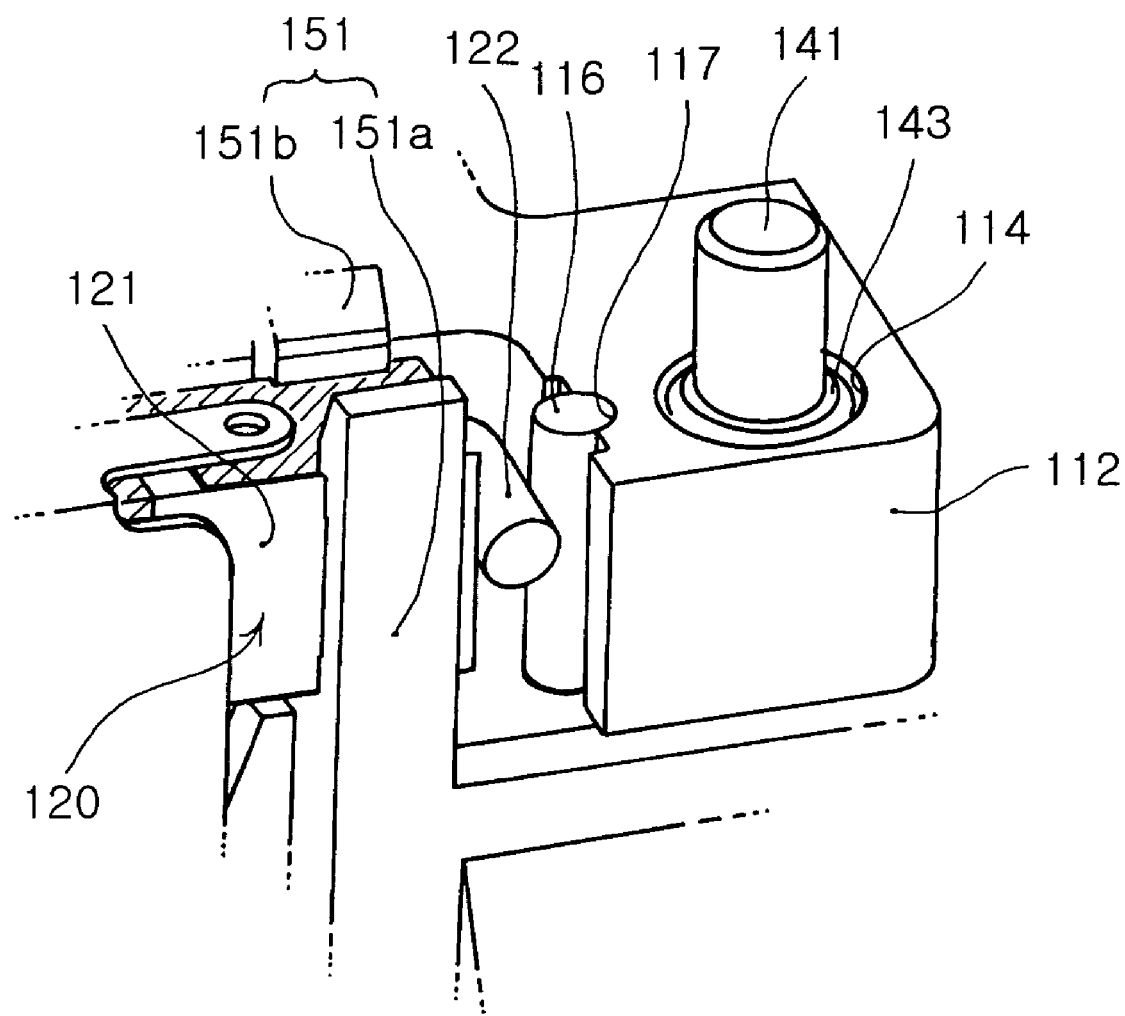
FIG. 6 is a detailed view illustrating an actuator in contact with an extension in the lens transfer device according to the invention.

FIG. 6 is a detailed view illustrating an actuator in contact with the extension in the lens transfer device according to the invention. Referring to FIG. 6, a contact member 116 is provided integrally in a vertical surface of the extension 112 facing the output member 122 of the actuator 120 to be in contact with the output member 122.

The contact member 116 is a friction member mounted on the vertical surface of the extension 112, and arranged to intersect perpendicularly with the output member 122 to make a point contact therebetween. Likewise to the output member 122, the contact member 116 is preferably made of a material such as ceramic and metal which has an excellent abrasion resistance and a relatively large friction coefficient.

While the contact member 116 of this embodiment has been illustrated as a structure arranged vertically to contact the output member 122 which is arranged horizontally of the actuator 120, it is not intended to be limiting. Rather, the contact member 116 may be arranged horizontally to contact the output member 122 which is arranged vertically of the actuator 120.

In addition, while the output member 122 and the contact member 116 of this embodiment have been illustrated as being cylindrical, it is not intended to be limiting. Rather, the output member 122 and the contact member 116 may have a semi-circular or elliptical cross section to make a point contact therebetween.

Furthermore, a groove 117 is preferably provided in the vertical surface of the extension 122 facing the output member 122 so that the contact member 116 can be fixedly placed in the groove 117.

In this case, the contact member 116 preferably has a length substantially the same as the height of the extension 112 so that it can contact the output member 122 more securely and stably.

The output member 122 is guided to a specific position under a specific amount of pressing force by means of an additional jig (not shown) so that the upper surface thereof is parallel with the actuator 120 and mounted to the actuator 120 in the pressed position by using a thermosetting resin adhesive.

In addition, the contact member 116 is guided to a specific position under a specific amount of pressing force by means of an additional jig (not shown) so as to be parallel axially with the first guide rod 141 and then mounted to the extension 116 by using a thermosetting resin adhesive.

The pressing member 130 is of an elastic body with a free end 131 and a stationary end 132. The stationary end 132 is fixed to the base 150 so that the free end 131 can contact the rear end of the actuator 120 opposite to the leading end thereof where the output member 122 is placed to force the actuator 120 toward the extension 112.

The pressing member 130 is preferably provided as a leaf spring in which the free end 131 is bent to contact the rear end of the actuator 120 and the stationary end 132 fixed to the base 150 is bent toward the lens barrel 110 to generate an elastic force.

Here, the pressing member 130 is preferably designed to be longer than the actuator in order to potentially produce an adjustable and suitable amount of pressing force.

The pressing member 130 has an upper fixing portion 133 extending to a predetermined length from the body at the free end 131 thereof to apply a downward force to an upper surface of the body 121 of the actuator 120.

The pressing member 130 also has a bend 134 at the leading end of the fixing portion 133, which is bent or convexed downward to be in contact with and apply an elastic force to the upper surface of the body 121.

Figure 7:
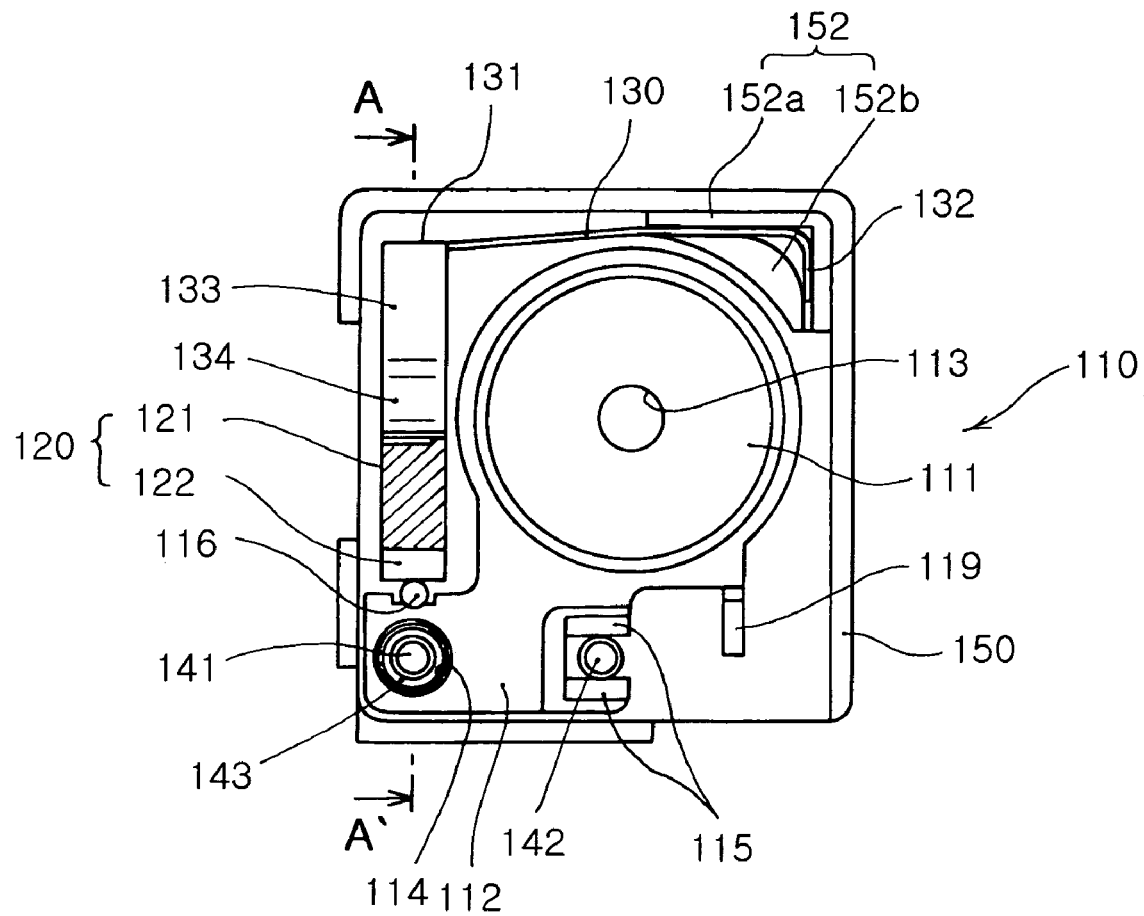
FIG. 7 is a plan view illustrating a lens transfer device according to the invention.
Figure 7:
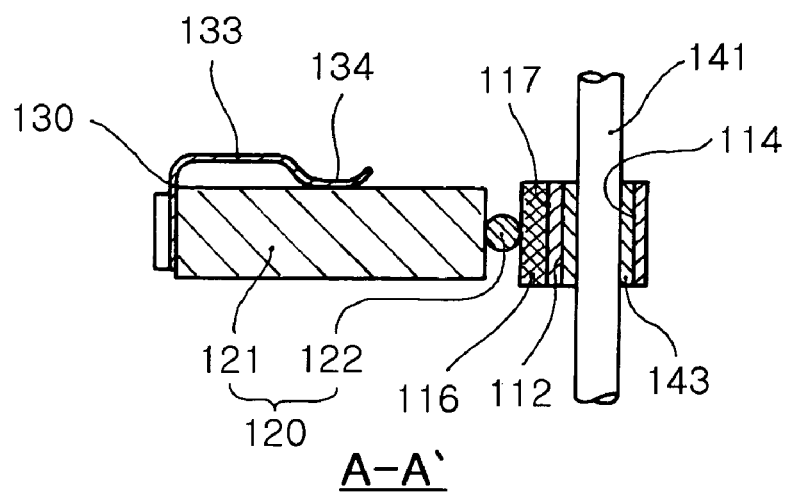

As shown in FIGS. 4, 5 and 7, the first and second guide rods 141 and 142 are provided in the guide 140 to guide the lens barrel 110 when the lens barrel 110 is reciprocally transferred along the optical axis by the driving force applied from the actuator 120.

The first and second guide rods 141 and 142 are cylindrical members of a predetermined length. The first guide rod 141 is fixedly inserted by the lower end into a first fixing hole 155 of the base 150 to be parallel with the optical axis, and the second guide rod 142 is fixedly inserted into a second fixing hole 156 of the base 150 to be parallel with the optical axis.

The first guide rod 141 is a rod member of a specific length and slidably assembled by means of a bushing 143. The bushing 143 is inserted into the guide hole 114 extending through the extension 112 to be parallel with the optical axis. As an alternative, the bushing 143 may be replaced by an oilless bearing.

The center of the first guide rod 141 is located coplanar with a contact point where the output member 122 of the actuator 120 meets the contact member 116 of the extension 112.

The second guide rod 142 is a rod member of a predetermined length with its outer periphery in point contact with a pair of the guide support protrusions 115 of the extension 112.

The pair of guide support protrusions 115 are provided in opposing portions of the extension 112 to prevent any rotational component from occurring during the vertical transfer of the lens barrel 110. Each guide support protrusion 115 is extended for a predetermined length in a direction perpendicularly crossing the pressing direction of the pressing member 130.

Preferably, the first and second guide rods 141 and 142 may be coated on the outer periphery with one material of fluorocarbons and molybdenum sulfides, such that when the lens barrel 110 is vertically transferred by a driving force applied from the actuator 120, the first and second guide rods 141 and 142 can generate a frictional force smaller than that occurring between the output member 122 and the contact member 116.

The lens transfer device 100 of this embodiment also includes the base 150 on which the lens barrel 110 is seated and an image sensor (not shown) and a board (not shown) are arranged as shown in FIGS. 4 and 5.

The base 150 is a injection-molded resin structure with first to third holders 151 to 153 thereof to fixedly locate the actuator 120, the pressing member 130 and the guide 140.

The first holder 151 is a stationary structure fixedly locating the body 121 so that the output member 122 of the actuator 120 contacts the extension 112 of the lens barrel 110.

The first holder 151 has U-shaped elastic pieces 151a (or at least one elastic piece) for supporting the underside surface and elastically contacting both side surfaces of the body 121 and holding projections 151b each extending respectively from the top end of each of the elastic pieces 151a to elastically contact the upper surface of the body 121.

Accordingly, the body 121 of the actuator 120 is inserted from above into between the elastic pieces 151a. Once the body 121 is inserted between the elastic pieces 151a, the holding pieces 151b hold the body 121 so that the body 121 does not separate to the outside or shake vertically or laterally.

In addition, the second holder 152 is a stationary structure provided at one corner of the base 150 to fix the stationary end 132 of the pressing member 130.

The second holder 152 has a pair of vertical ribs 152a and 152b, which are L-shaped with a gap therebetween so that the stationary end 132 of the pressing member 130 is fixedly inserted into the gap.

In the third holder 153, the first fixing hole 155 receives the lower end of the first guide rod 141 of the guide 140, the second fixing hole 156 receives the lower end of the second guide rod 142 of the guide 140, in which the centers of the first and second fixing holes 155 and 156 are placed coplanar.

The lens barrel 110 has a detection bar 119 formed integrally at one side thereof, and the lens transfer device 100 also has a location sensor 160 for detecting the vertical location of the detection bar 119 to determine the position change of the lens barrel 110.

The location sensor 160 is fixed in position to a fourth holder 54 of the base 150, which is formed in an area corresponding to the detection bar 119. The location sensor 160 has a plurality of terminals 165 for transmitting/receiving signals.

The lens transfer device 100 also includes a housing 170 arranged over the base 150 as shown in FIGS. 4 and 5 to protect the lens barrel 110, the actuator 120, the pressing member 130 and the location sensor 160 from external environments.

The housing 170 is of a resin structure, and has an opening 171 and an assembly hole 172. The opening 171 is formed at a predetermined size in the upper surface of the housing 170 to expose the incident hole 113 of the lens barrel 110. The assembly hole 172 is perforated in the housing 170 to be engaged with an assembly protrusion 157 projected from an outer surface of the base 150.

The housing 170 is combined with the base 150 by means of a fixing screw 173 engaging into a screw hole (now shown) of the base 150.

According to the lens transfer device 100 of this embodiment, the process of transferring the lens barrel 110 with at least one lens mounted therein along an optical axis is carried out by applying external supply voltage to the actuator 120 through the electrode terminals 123 formed on the body 121 of the actuator 120 so that the body 121 with the piezoelectric sheets transform their shape to generate a driving force to transfer the lens barrel 110.

Figure 8:
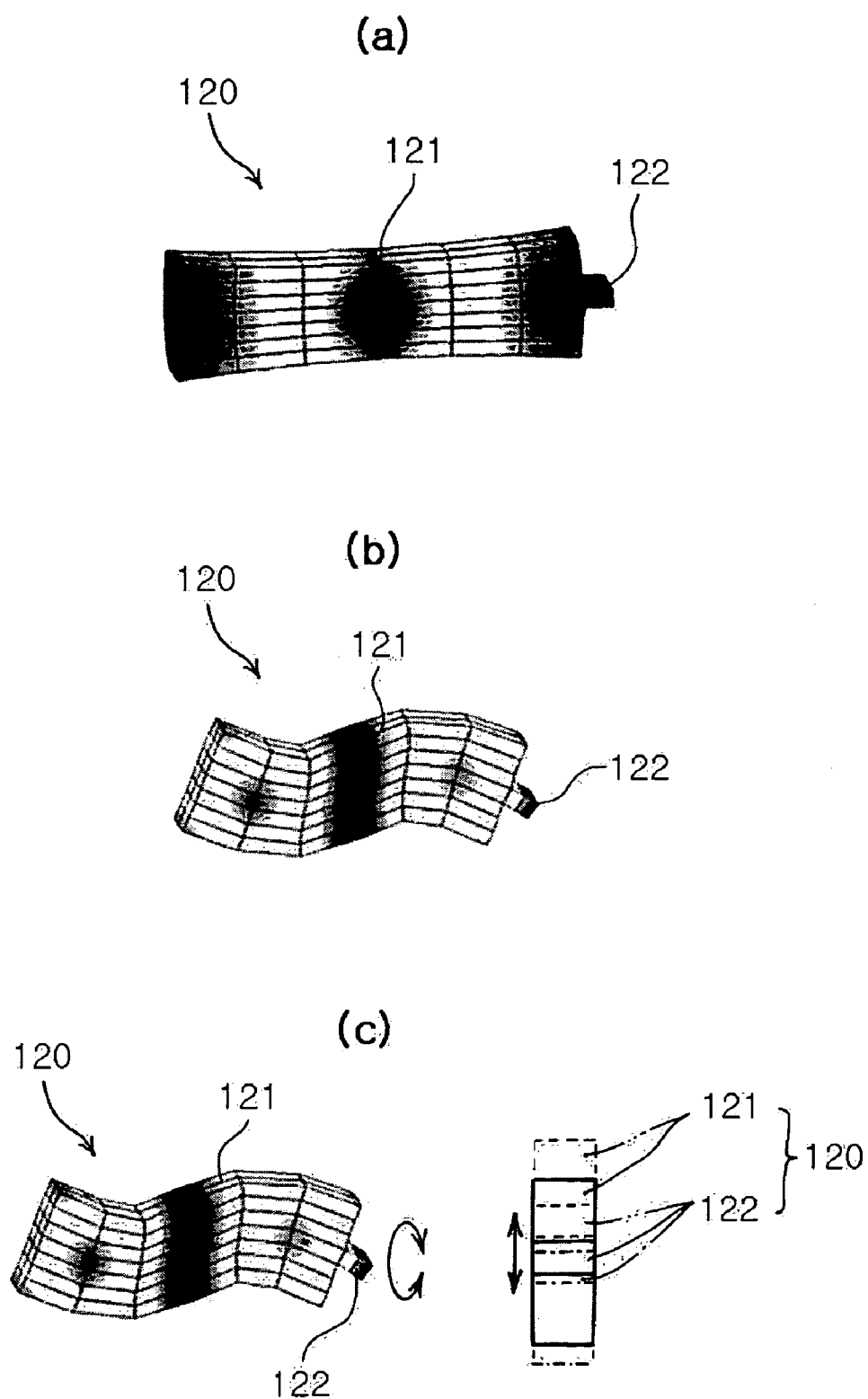
FIG. 8 illustrates an actuator adopted in the lens transfer device according to the invention, in which (a) illustrates a body expanded/contracted in a longitudinal direction, (b) illustrates the body bent in a vertical direction, and (c) illustrates the body having a synthetic transformation of expansion/contraction and bending.

At a supply voltage in the range of resonant frequency of about 222 kHz applied to the body 121 of the actuator 120, the body 121 transforms its shape longitudinally with the output member 122 as shown in FIG. 8(a). At a supply voltage in the range of resonant frequency of about 230 kHz applied to the body 121, the body 121 transforms itself into a serpent (S) shape as shown in FIG. 8(b).

Accordingly, at a supply voltage in the range of resonant voltage of about 230 kHz intermediating between the above resonant frequencies applied to the body 121, the body 121 has an expansion/contraction vibration mode in a longitudinal direction and a bending vibration mode in a height direction occurring simultaneously. Then, the output member 122 mounted at the leading end of the body 121 vibrates along an elliptical locus when seen laterally of the body 121 and vibrates linearly when seen in front of the body 121. Such a motion is generated through synthesis of the expansion/contraction and the bending.

Since the actuator 120 is fixed to the first holder of the base so that the elliptical motion is restrained, the output member 122 performs a linear motion, of which direction is converted according to the polarity of the supply voltage applied to the body 121.

The output member 122 outputting only a vertical vibration locus is adapted to transfer the driving force via the contact member 116 of the extension 112 of the lens barrel 110 to be transferred so that the lens barrel 110 is elevated or lowered in the direction of the optical axis along the first and second guide rods 141 and 142.

Since the frictional force generated between the output member 122 and the contact member 116 is larger than a frictional force from the first guide rod 141 and the output member 122 and the contact member 116 perform a point contact with the optical axis of the lens barrel 110 not offset with respect to the vertical axis, the vertical transfer of the lens barrel 110 can be carried out more stably.

Here, the contact point where the output member 122 meets the contact member 116 is maintained constant under the elastic force of the pressing member 130 that forces the actuator 120 against the extension 112.

Since the contact point where the output member 122 and the contact member 116 meet each other is located coaxially with the center of the guide hole 114, the first guide road and the bushing 143, the elastic force of the pressing member 130 directed toward the extension can be transferred to the extension 112 without loss, thereby maximizing the performance of the actuator 120.

The transfer of the lens barrel 110 by the driving force from the actuator 120 is carried out along the first guide rod 141 which is assembled into the guide hole 114 of the extension 112.

Here, in order to prevent any gap occurring between the inner periphery of the guide hole 114 and the outer periphery of the first guide rod 141 owing to the difference between the roundness of the inside diameter of the guide hole 114 and the roundness of the outside diameter of the guide rod 141, the first guide rod 141 is assembled to the guide hole 114 via the bushing 143. With this, the first guide rod 141 is not offset with respect to but remains parallel with the optical axis so that the vertical transfer of the lens barrel 110 can be performed more stably.

In addition, the second guide rod 142 arranged vertical and separated with a predetermined distance from the first guide rod 141 performs a point contact with the pair of guide support protrusions 115 of the extension 112 so that the outer periphery of the second guide rod 142 is protruded perpendicularly with respect to the pressing direction of the pressing member 130. This as a result prevents the lens barrel 110 from rotating about the first guide rod 141 during the vertical transfer of the lens barrel 110.

Since the first and second guide rods 141 and 142 are coated on the outer periphery with a coating material such as fluorocarbons and molybdenum sulfides, a low friction coefficient is obtained from between the first guide rod 141 and the bushing 143 and between the second guide rod 142 and the guide protrusions 115. This friction coefficient is lower than that obtained between the output member 122 and the contact member 116 which are made of ceramics or metal of excellent friction resistance and relatively high friction coefficient. Accordingly, the power loss of the actuator 120 can be minimized and the vertical transfer of the lens barrel 110 can carried out more stably.

In addition, the location sensor 160 detects the motion of the lens barrel 110 which is vertically transferred along the first and second guide rods 141 and 142. The location sensor 160 locates the lens barrel 110 by detecting the detection bar 119 protruding from the lens barrel 110.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

As set forth above, the invention provides a driving mechanism for transmitting a driving force of an actuator toward a lens barrel, in which the actuator is in point-contact with the extension extending radially from the lens barrel and forced against the extension by the pressing member. The driving mechanism can be further simplified over a conventional cam/electromagnetic driving mechanism, thereby further miniaturizing an optical instrument.

In addition, the invention can minimize any loss of driving force transmitted to the lens barrel subject to transfer as well as any loss owing to frictional force during the transfer of the lens barrel, thereby producing a large amount of displacement from a low input voltage and enhancing driving efficiency.

Furthermore, a simple structure of guide mechanism is provided to guide the transfer of the lens barrel in more precisely and stably, and thus images of more excellent qualities can be produced.

What is claimed is:

1. A lens transfer device comprising:
at least one lens;
a lens barrel having a lens receiving part with the lens arranged in an inner space thereof and an extension extending radially from an outer surface of the lens receiving part;
an actuator having a body and an output member provided at a leading end of the actuator to contact the extension, the body adapted to expand/contract and bend in response to an external supply voltage to provide a driving force necessary for transfer of the lens barrel through the output member;
a pressing member with a free end contacting a rear end of the actuator to force the actuator against the extension; and
a guide for guiding the transfer of the lens barrel along an optical axis,
wherein the pressing member comprises a leaf spring to apply an elastic force to the actuator, the leaf spring having a free end bent outward to contact the rear end of the actuator and a fixing end bent toward the lens barrel, and
wherein the pressing member further includes an upper fixing portion extending at a predetermined length toward the body from the free end of the pressing member to force an upper surface of the body of the actuator directly downward.

2. The lens transfer device according to claim 1, wherein the actuator comprises a piezoelectric ultrasonic motor having a box-shaped body comprising a plurality of piezoelectric sheets stacked one on another.

3. The lens transfer device according to claim 1, wherein the extension has a contact member in a vertical surface thereof facing the output member, the contact member oriented to contact and intersect perpendicularly with the output member.

4. The lens transfer device according to claim 3, wherein the extension has a recess formed in the vertical surface thereof to receive the contact member.

5. The lens transfer device according to claim 3, wherein the contact member has a height substantially the same as that of the extension.

6. The lens transfer device according to claim 1, wherein the upper fixing portion has a bent portion convexed downward from a leading end of the fixing portion to contact and apply elastic force to the upper surface of the body.

7. The lens transfer device according to claim 1, wherein the pressing member is formed longer than the actuator.

8. The lens transfer device according to claim 1, wherein the extension has a guide hole perforated therein to be parallel with the optical axis, and
wherein the guide has a first guide rod of a predetermined length inserted into the guide hole of the extension and a second guide rod of a predetermined length with an outer periphery contacting the extension to prevent the lens barrel from rotating.

9. The lens transfer device according to claim 8, wherein the first guide rod is assembled to the guide hole via one of a bushing and an oilless bearing.

10. The lens transfer device according to claim 8, wherein the first guide rod has a center located coplanar with a contact point where the output member of the actuator meets the contact member of the extension.

11. The lens transfer device according to claim 8, wherein the extension has a pair of guide support protrusions projecting therefrom in a direction perpendicular to a pressing direction of the pressing member, and wherein the outer periphery of the second guide rod is adapted to contact the guide support protrusions of the extension.

12. The lens transfer device according to claim 8, wherein the first and second guide rods are coated on outer peripheries with one material of fluorocarbons and molybdenum sulfides to minimize frictional force.

13. The lens transfer device according to claim 1, further comprising a base on which the lens barrel is seated,
wherein the base has a first holder fixing the body of the actuator so that the output member of the actuator contacts the extension of the lens barrel, a second holder fixing a stationary end of the pressing member and a third holder fixing a lower end of the guide.

14. The lens transfer device according to claim 13, wherein the first holder has at least one U-shaped elastic fixing piece supporting a lower surface and elastically contacting both side surfaces of the body and a holding projection extending from a top end of the elastic piece to elastically contact an upper surface of the body.

15. The lens transfer device according to claim 13, wherein the second holder has a pair of vertical ribs which are L-shaped with a gap therebetween so that the stationary end of the pressing member is fixedly inserted into the gap.

16. The lens transfer device according to claim 13, wherein the third holder has first and second fixing holes receiving lower ends of the first and second guide rods of the guide, respectively.

17. The lens transfer device according to claim 1, the lens barrel has a detection bar formed at one side thereof,
the device further comprising a location sensor for detecting vertical location of the detection bar.

18. The lens transfer device according to claim 1, further comprising a housing for protecting the lens barrel, the actuator, the pressing member and the guide from external environments.

* * * * *